United States Patent [19]

Hathaway

[11] 3,719,090

[45] March 6, 1973

[54] METHOD AND APPARATUS FOR MEASUREMENT OF PARTICLE SIZE AND PERCENT SOLIDS IN MULTIPLE PROCESS FLOWSTREAMS

[75] Inventor: Robert E. Hathaway, Boulder, Colo.

[73] Assignee: Autometrics Co., Boulder, Colo.

[22] Filed: March 8, 1971

[21] Appl. No.: 121,879

[52] U.S. Cl. ................................73/432 PS, 73/61 R
[51] Int. Cl. .............................................G01n 15/02
[58] Field of Search ........................73/432 PS, 61 R

[56] References Cited

UNITED STATES PATENTS

| | | | |
|---|---|---|---|
| 3,439,800 | 4/1969 | Tonjes | 73/432 PS X |
| 3,523,733 | 8/1970 | Kling et al. | 73/432 PS X |
| 3,545,281 | 12/1970 | Johnston | 73/432 PS |

*Primary Examiner*—Louis J. Capozi
*Assistant Examiner*—Joseph W. Roskos
*Attorney*—Anderson, Spangler & Wymore

[57] ABSTRACT

Method and apparatus for measurement of particle size and percent solids in multiple process flowstreams. A plurality of process flowstreams are presented to one sensing system adapted to measure particle size and percent solids in a liquid-solids slurry in a manner to permit generation of electrical output data representative thereof in a sequence and identifiable with the process flowstreams being measured. The electrical output data is sequentially applied to electrical controls associated with a flowstream to regulate particle size and percent solids therein.

13 Claims, 11 Drawing Figures

FIG. 2

INVENTOR.
ROBERT E. HATHAWAY
BY
Anderson, Spangler & Wymore
ATTORNEYS

METHOD AND APPARATUS FOR MEASUREMENT OF PARTICLE SIZE AND PERCENT SOLIDS IN MULTIPLE PROCESS FLOWSTREAMS

BACKGROUND OF THE INVENTION

This invention relates broadly to size reduction processes by crushing, grinding, pulping and the like, and more particularly to the monitoring of particle size and percent solids in a liquid-solids slurry flowstream under dynamic conditions and determining the deviation, if any, of the particle size and percent solids in a process flowstream from a predetermined particle size and percent solids. This invention contemplates the method and apparatus for monitoring the particle size and percent solids of a plurality of process flowstreams using one monitoring system for several flowstreams. While the invention may have utility in any situation where it is desirable to determine the change in particle size and percent solids in a slurry in processes such as grinding, sizing, separating, recovery and/or treating materials, the invention is particularly useful in the mining and milling industry. Further, the development of an electrical signal which is a function of the amount and direction of deviation, permits the control, correction and maintenance of a predetermined particle size and percent solids in a slurry.

The mining and milling industry is presently engaged in a rapid transition toward automating their processes. The milling of mined ores is especially important because it is the most costly of the process steps by which valuable mineral is recovered from ore. The efficiency of the milling process is therefore of extreme importance. The size of the particles to which the ore is ground is one of the most important considerations for controlling the operation of a modern mill circuit. There is usually a particular range of particle size and percent solids that represents the best compromise between the cost of making a further size reduction and the amount of additional mineral that will be so liberated by so doing. Accurate, continuous determination of particle size and percent solids in the milled ore slurry would enable more efficient control of the grinding circuit by either manual or automatic means. In the past, methods for determining particle size were not continuous and were very slow. Until recently, the screen analysis of the product was the only reliable method available. This required the removal of a representative sample from the flowstream and a laboratory analysis to determine the particle size distribution. On the basis of these results, the equipment was adjusted in an attempt to bring the product closer to the optimum particle size distribution. It was difficult, if not impossible to run this type of test more than a few times each shift.

With infrequent adjustments based on screen analysis, the equipment could run for many hours providing an incorrect grind without the operator's knowledge. Producing too fine a product is known as overgrinding and producing a product that is too coarse is termed undergrinding. In either case it causes problems in subsequent concentration processes. Undergrinding produces particles that may be too large to liberate the desired mineral. Where the concentration of the milled, mineral-bearing ore is accomplished by froth flotation, too-large particles may be lost due to the inability of the attached bubbles to lift the greater weight of these particles. Overgrinding produces a relatively high proportion of particles that are so small that the time to recover them becomes too long. Since the time to accomplish separation must be held to a minimum, in order to achieve a satisfactory recovery rate, many of the very small particles containing mineral values are not recovered and the efficiency of values recovery in the ore concentration process is reduced. Because of the increased surface area of the very small particles, more reagent is required to achieve selective flotation of the mineral-bearing ore at increased expense. When greater amounts of reagent are required to compensate for the undersized particles, the selectivity of the process often suffers, reducing the over-all efficiency of the mineral recovery.

In all milling operations, wear, power consumption and time-to-grind are major contributors to cost, and so there is a strong motivation on the part of the mill operators to grind only as long as necessary. In order to determine this the operators need a quickly obtained reading of the particle size distribution which can be compared with an optimum particle size distribution.

Most mill operators attempt to control the equipment in their mill circuit to maintain an output therefrom to flotation (or other concentration means) having an optimum particle size distribution. Measurement of particle size distribution has in the past been made by removing one or more samples from the flowstream, often between the classifier and flotation, and performing a screen analysis thereon. A screen analysis involved a series of procedures by which a measurement was made of the proportion of the sample that remained on each of several screens having progressively smaller openings of known size. While this kind of measurement could provide reasonably accurate determination of particle size distribution, it is representative only of the particular sample taken, and cannot accurately and reliably indicate either the average condition in a flowstream over a period of time, or the changes that occur between sampling. Therefore, this technique does not lend itself to precise control of the milling circuit by either manual or automatic control methods.

Attempts have been made in the past to use the percent by weight of solids in the slurry flowing from the classifier to flotation as an indicator of particle size distribution. However, because the relationship between percent by weight of solids and particle size distribution is not consistent, this method of determining particle size distribution has proven unreliable.

It is apparent that the mining and milling industry has need of an instrument that is sensitive to the size of particles only and can make continuous measurements. Such an instrument forms the subject matter of copending application for U. S. Pat. Ser. No. 866,976 filed Oct. 16, 1969, for "Particle Size and Percent Solids Monitor" assigned to the same assignee which has been allowed and abandoned in favor of a continuation-in-part application for U.S. Pat., Ser. No. 201,504, filed Nov. 23, 1971, for "PARTICLE SIZE AND PERCENT SOLIDS MONITOR". One method of controlling a mill circuit therewith involves sensing the particle size distribution in the slurry prior to flotation and regulating the amount of unmilled ore being delivered to the circuit on the basis of the difference between measured and optimum particle size distribution. The hardness or grindability of ore coming into the mill frequently changes and will require an appropriate variation in the time to mill the ore to the desired particle size. Controlling the milling circuit in this manner is effective in regulating the size of particles of ore going to flotation and the over-all efficiency of the values recovery.

The invention forming the subject matter of U. S. Ser. No. 866,976, above identified, is directed to a particle size and percent solids monitor which comprises a source of ultrasonic energy and an ultrasonic energy detector, positioned to transmit and detect the amount of ultrasonic energy transmitted through a fluid containing solid particles, i.e., a slurry, with the system being adapted to develop an output signal which represents response to both changes in particle size and percent solids in the slurry. Means are also provided to develop a signal which is representative of the percent solids content which is effectively subtracted from the signal representative of the particle size and percent solids content so as to provide a resultant signal representative of the mean particle size only and variations therein. The particle size and percent solids monitor of U. S. Ser. No. 866,976 has a degree of sensitivity to the presence of air bubbles in the slurry flowstream and it is desired to maintain the amount of entrained air either relatively constant or to provide air removal or stabilizing apparatus such as that disclosed and claimed in U. S. Pat. application Ser. No. 034,949 filed May 6, 1970, entitled "Method and Apparatus for the Removal of Entrained Gases from Mineral Slurries, Pulps, Liquids and the Like," assigned to the same assignee as the present application, to remove the entrained air before measurement of mean particle size and percent solids is made. The air removal system according to the above application comprises a rotating chamber having a series of orifices exhausting by centrifugal force the liquid of an entrained gas-liquid feed into an outer liquid body while the entrained gases are withdrawn from the interior of the chamber under a reduced pressure.

While the particle size and percent solids monitor of the application above identified provides a significant advance in the art, the monitor is adapted and disclosed for use in monitoring and controlling a single flowstream. There has been discovered and devised a system and method for effectively and automatically monitoring and controlling a plurality of flowstreams using a single monitor. The system includes a sample cutting mechanism for periodically cutting a sample from a flowstream in sequence. Each of the samples are passed through a sensing section of the monitor system which is capable of generating a signal representative of the mean particle size. A control device is provided in each of the flowstreams to regulate the grind and regrind cycle to control the particle size and percent solids in the flowstream. This may be accomplished by either controlling the amount and size of material separated and recycled through the grinding circuit or control of the addition of new feed with the recycle being kept essentially constant.

Thus an automatic and periodic sampling of each of the flowstreams in the grinding operation may be made, the samples analyzed in the sensor in sequence and the results of the analyses used to control the amount and size of the ore returned to the regrind circuit to establish the amount of grinding required.

The present invention provides means of obtaining the immediate and effective control of an ore grinding circuit before the process parameters have had an opportunity to change significantly. Also a plurality of flowstreams can be analyzed and controlled by a single monitor system.

These and other objects and advantages of the invention will be apparent and more readily understood when the following description is read in connection with the accompanying drawings.

DESCRIPTION OF THE PREFERRED EMBODIMENTS

Figure 1:
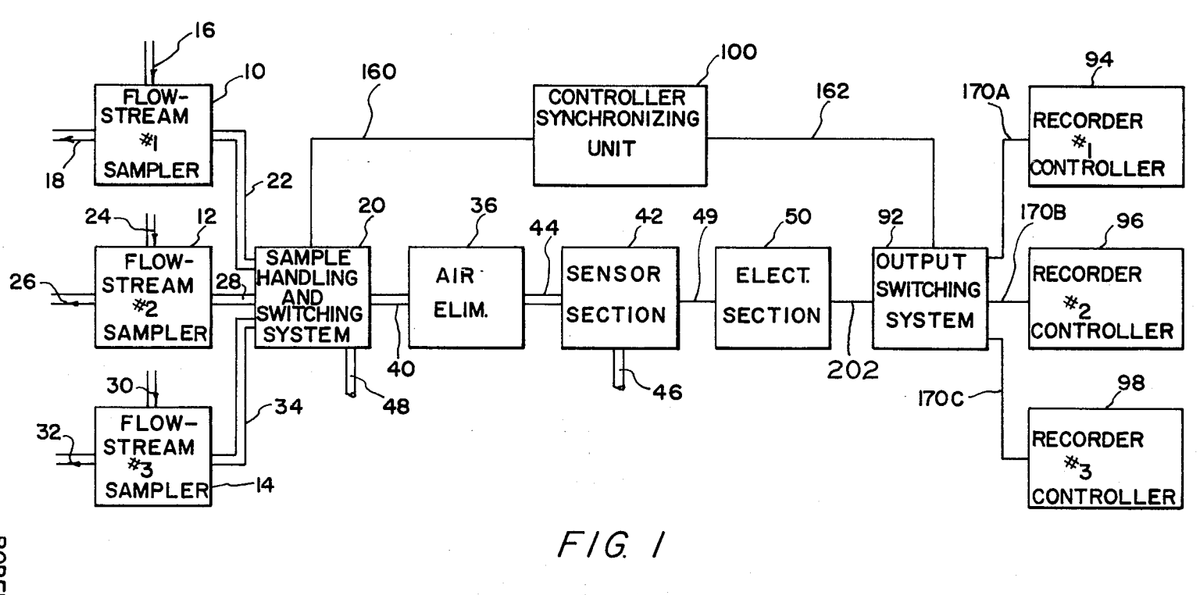
FIG. 1 is a schematic block diagram of a first embodiment of the invention which uses a single air eliminator.

A first preferred embodiment of the invention as shown in FIG. 1 provides for the sampling of several flowstreams, three being shown by samplers 10, 12 and 14 which may be a Model S2 Denver automatic ore and pulp sampler manufactured by the Denver Equipment Division of Joy Manufacturing Company of Denver, Colorado, including the Denver type "A" wet sample cutter shown on pages 10, 11 and 17 of specification manual S1–B14A which removes a representative sample from a flowstream on a continuous or predetermined intermittent basis, or simply a screened intake line may be used which draws a sample from a well agitated sump in the flowstream.

Flowstream No. 1 enters the No. 1 flowstream sampler 10 by means of inlet 16 and exits outlet 18. A sample is extracted therefrom and is passed to the sample handling and switching system 20 via conduit 22. In like manner, flowstream No. 2 enters the No. 2 flowstream sampler 12 by means of inlet 24 and exits outlet 26. A sample is extracted therefrom and is passed to the sample handling and switching system 20 via conduit 28. Also in like manner flowstream No. 3 enters the No. 3 flowstream sampler 14 by means of inlet 30 and exits outlet 32. A sample is extracted therefrom and is passed to the sample handling and switching system 20 via conduit 34. The samples may be extracted from the flowstreams on a continuous basis or on a predetermined intermittent basis. Where the samples are passed to the sample handling and switching system 20 on a continuous basis, the sample stream which is being monitored is passed on to the air eliminator 36 via conduit 40 and after removal of the air from the sample it is passed to the sensor section 42 via conduit 44. The sample after being sensed by the sensor section is discharged through conduit 46. The samples passing into the sample handling and switching section 20 which are not then being passed to the air eliminator 36 and sensor 42 are allowed to escape through outlet 48.

The sensor section 42 feeds signals into the electronics section 50 via conductor 49 and the output from the electronics section is fed to an output switching section 92. The output from the electronics section is switched to recorder-controller No. 1, 94, or recorder-controller No. 2, 96, or recorder-controller No. 3, 98, depending on whether flowstream sample No. 1, or No. 2 or No. 3 is present in sensor 42. The switching of the output from the electronics section is synchronized with the particular sample being examined by means of the controller synchronizing unit 100, to be explained in greater detail as the disclosure progresses.

Figure 10:
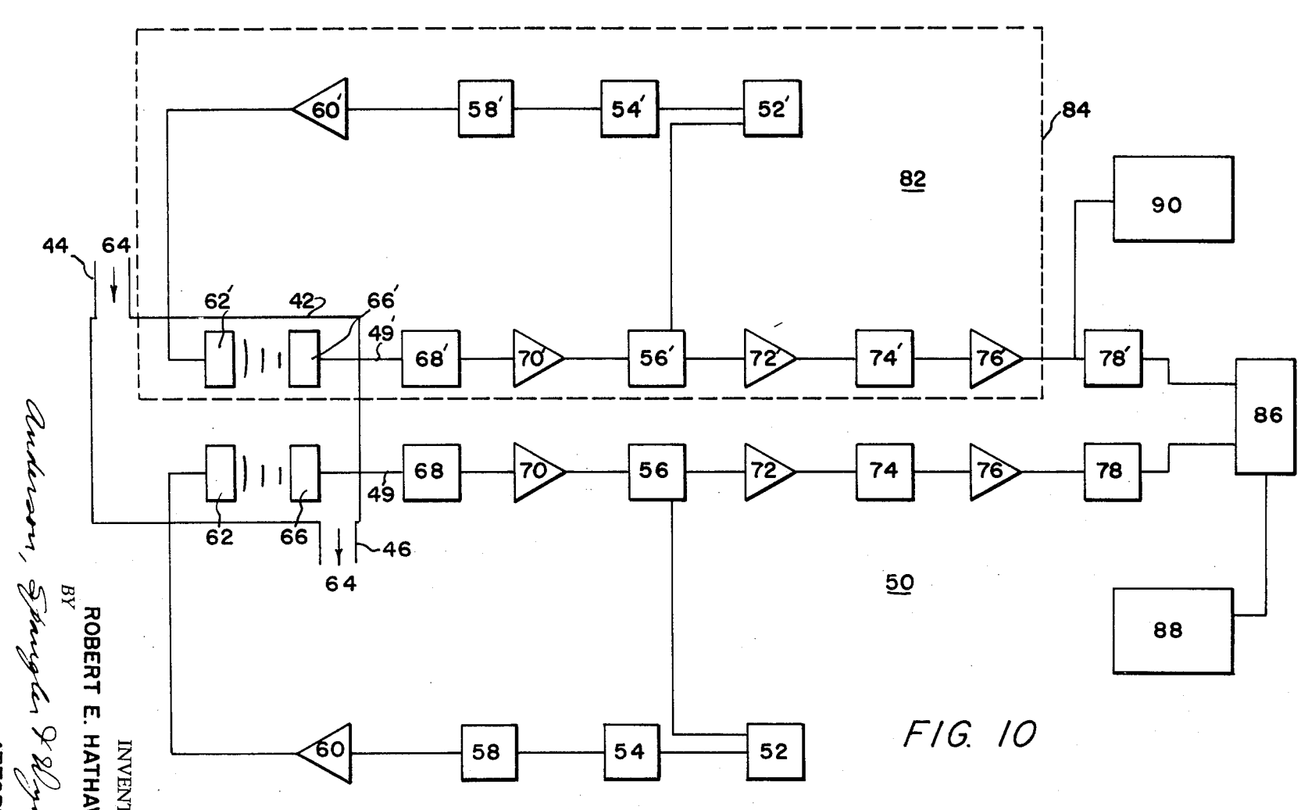
FIG. 10 is a block diagram of the circuitry of a suitable system for the measurement and monitoring of the mean particle size and percent solids in a slurry.

A suitable sensor section 42 and the electronics section 50 are set forth in greater detail in FIG. 10. Referring now to FIG. 10, there is shown a block diagram of the particle size monitor set forth and claimed in U. S. Pat. application Ser. No. 866,976. A clock generator 52 provides sequentially timed output pulses which are applied to keyer 54 and to gate 56, turning them on and off at the clock rate. The pulse to gate 56 is delayed behind the pulse to keyer 54 for reasons that will be explained presently. Upon receipt of a pulse from clock 52, keyer 54 turns on oscillator 58, causing it to oscillate at its preset frequency for the duration of the clock pulse. The duration and repetition rate of the clock pulses are selected for the convenience of subsequent electronics circuitry, and are not critical to the practice of this invention. The output of the oscillator is amplified by amplifier 60 and applied to a suitable transmitting transducer 62 coupled to a sample of the flowstream 64 passing through the sensor section 42 having an inlet conduit 44 and an outlet 46 which may be in the form of a vessel to which the transducers have been affixed, or a pipe, trough, and the like. A receiving transducer 66 is also coupled to the sample 64 and located a predetermined distance away from transducer 62 such that a transmission path is established through the sample from transmitter 62 to receiver 66. The operating frequency of oscillator 58 is chosen such that the attenuation thereof increases with the particle size distribution of suspended particles becoming more coarse and decreases with the particle size becoming more fine. It will be appreciated by those skilled in the art that a single transducer may serve as both transmitter and receiver with appropriate gating and the provision of a reflector means for reflecting the transmitted signal back to the transducer for detection. The transmitted signal received by receiver 66 is applied via conductor 49 to a signal conditioner 68, which compresses the incoming signal into a logarithmic signal, reducing the dynamic range requirements of the high gain amplifier 70 and subsequent circuitry. Signal conditioner 68 employs a pair of back-to-back diode-connected transistors, the impedance of which vary logarithmically with the application of a D.C. potential, in this case derived from a feedback signal from the output amplifier 76. The amplified signal from amplifier 70 is applied to the input of gate 56 and permitted to pass through gate 56 only upon command from clock 52. The gate signal from clock 52 is time phased with respect to the keyer signal so as to prevent the passage of any signal through gate 56 when transducer 62 is transmitting. This prevents the passage to amplifier 72 of signals resulting from coupling of the high level transmitting signals into amplifier 70 through the power supply, ground loops, electrostatic coupling, etc. Since a finite time is required for the signal transmitted by 62 to reach receiver 66, the keyer 54 is turned off and the gate 56 turned on by clock 52 before the transmitted signal reaches receiver 66. Gate 56 is again closed after passage of the signal received by 66 prior to the subsequent burst from transmitter 62; this process repeating itself at the clock repetition rate. The output from gate 56 is applied to detector 74 through driving amplifier 72. Detector 74 converts the output signal from amplifier 72 into a direct current (D.C.) voltage which is amplified by output amplifier 76 for feedback to signal conditioner 68 and application to signal conditioner 78. In signal conditioner 78, the D.C. signal from amplifier 76 is adjusted by means of variable attenuators so as to have the proper amplitude for application to summing network 86, the operation of which will be described presently.

Also included in FIG. 10, is a system 82 for measuring the percent by volume of solids in the sample, enclosed by the dotted line 84, which may in substance be a duplicate of the system identified by reference numerals 52 through 78 and identified by the same numerals primed operating at a frequency to be sensitive substantially only to the percent solids in the sample. Alternatively, the measurement of solids content in the slurry may be performed by any other well-known method or system, such as a nuclear gauge, a buoyancy measuring device, or a means of continuously weighing the flowstream and the like.

Again, referring to FIG. 10, the output of signal conditioner 78, which contains particle size and percent solids information, and the output of 78', which contains percent solids information from system 82, are fed to a summing network 86. In the summing network, the two "amplitude adjusted" signals from 78 and 78' are summed therein into a dual input differential amplifier. In the differential amplifier, one signal is inverted prior to summing so that the signal from 82 containing percent solids information only is effectively subtracted from the signal containing both particle size and percent solids information, yielding an output to a readout device 88, which is substantially a function of particle size only. Readout device 90 may be connected to the output of amplifier 76' to give a continuous indication of percent solids by volume in the sample. Readout devices 88 and 90 may be recorders, oscillographs, meters, controllers, and the like. It will be appreciated by those skilled in the art that alternative methods of combining the signals from 78 and 78' might be used to derive the desired output signal, which is a function of particle size only. For example, the signal from 78 containing particle size and percent solids information could be electronically divided by the solids content signal from 78'. Such an approach is practical and although it involves somewhat more complex electronics circuitry, it permits accurate operation over a wide range of particle size variations.

Figures 4, 5:
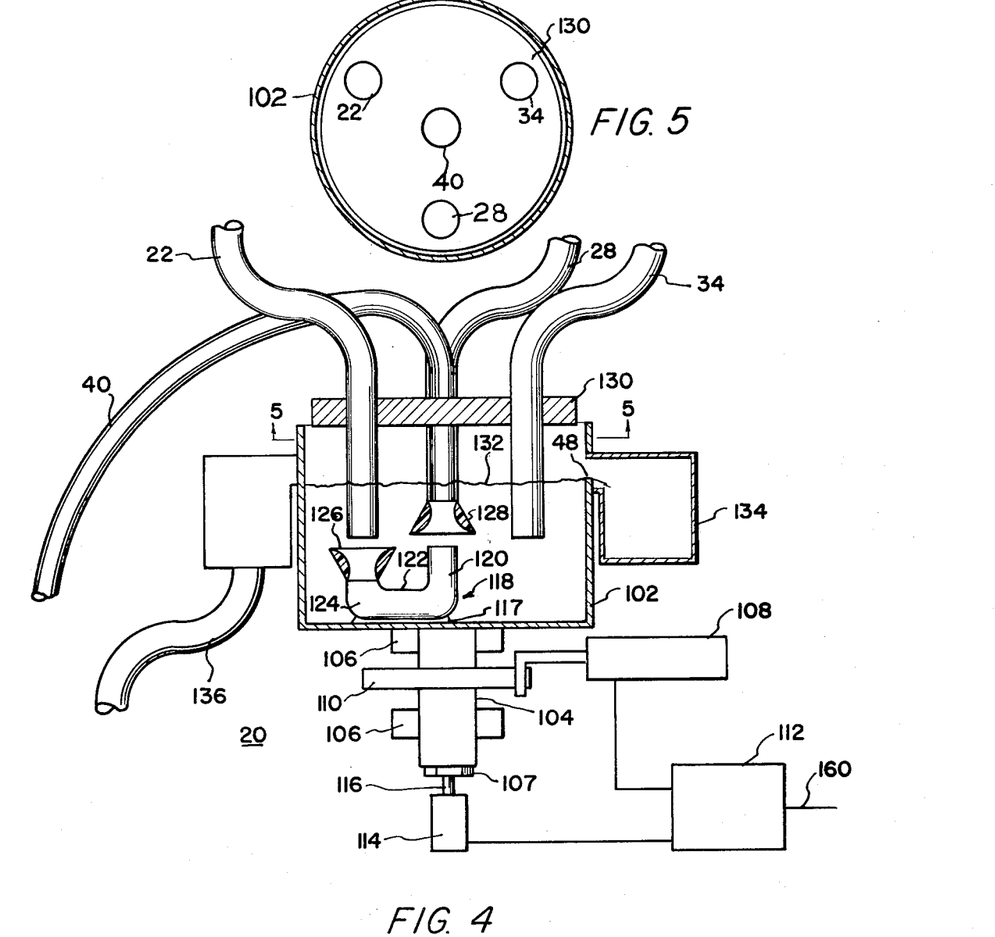
FIG. 4 shows a form of sample handling and switching mechanism suitable for use with the embodiment of FIG. 1.
FIG. 5 is a view along line 5—5 of FIG. 4.

Referring now to FIG. 4 there is shown one form of the sample switching system 20 for use in a multiple flowstream monitoring system such as that depicted in FIG. 1 where a plurality of samples are to be delivered through a single air eliminator 36 to a sensor section 42. The sample switching system of FIG. 4 comprises a tank 102 mounted for rotation about a vertical axis on a shaft 104 and supported on suitable bearings 106 and thrust bearings 107. Shaft 106 and tank 102 are selectively rotated by means of a rotating mechanism 108 through suitable drive mechanism 110. The rotating mechanism 108 is controlled by a programmer 112 upon command of the synchronizing unit 100. A lifting mechanism 114 is connected to tank 102 through shaft 116 and is adapted to raise tank 102 in programmed relation through programmer 112 on command of synchronizing unit 100. Positioned within tank 102 and secured to the bottom thereof by suitable means such as welding 117 is a U-shaped pipe 118 with one upstanding leg 120 being located at the center of rotation of the tank and the horizontal portion 122 extending radially from the center of rotation and the other upstanding leg 124 spaced outwardly from the center of rotation. The outer upstanding leg 124 is provided with a resilient collar 126 adapted to receive the end of pipes 22, 28 and 34 in turn in fluid tight relation. The end of pipe 40 within tank 102 is also fitted with a resilient collar 128 adapted to receive the centrally positioned upstanding leg 120 of U-shaped pipe 118. Pipes 22, 28, 34 and 40 are received through openings in a plate 130 which serves to support and position the pipes as depicted in FIGS. 4 and 5. Tank 102 is provided with an overflow pipe 48 which maintains the liquid level 132 within the tank. An annular chamber 134 around tank 102 receives the overflow from pipe 48 and discharges same through pipe 136. When a signal is received from the controller-synchronizing unit 100 and applied to the programmer 112, tank 102 is lowered by the lifting mechanism 114 to the position shown in FIG. 4. The programmer then actuates the rotating mechanism 108 to rotate tank 102 to a position where the collar 126 of pipe 118 is rotated and indexed beneath the end of the selected one of the pipes 22, 28, or 34. The programmer then energizes the lifting mechanism 114 whereupon the tank 102 is lifted until the resilient collars 126 and 128 are positioned over the end 120 of U-shaped pipe 118 and the end of selected pipe 22, 28 or 34 completing a connection between the selected pipe 22, 28 or 34 and pipe 40 leading to the air eliminator 36.

As pointed out previously, the air eliminator may be of the type disclosed in U.S. Pat. application Ser. No. 034,949 assigned to the same assignee. The purpose of the air eliminator is to eliminate entrained gases from a slurry before introduction into the sensor unit 42 so as to avoid errors attributable to entrained gas.

Figures 6, 7, 11:
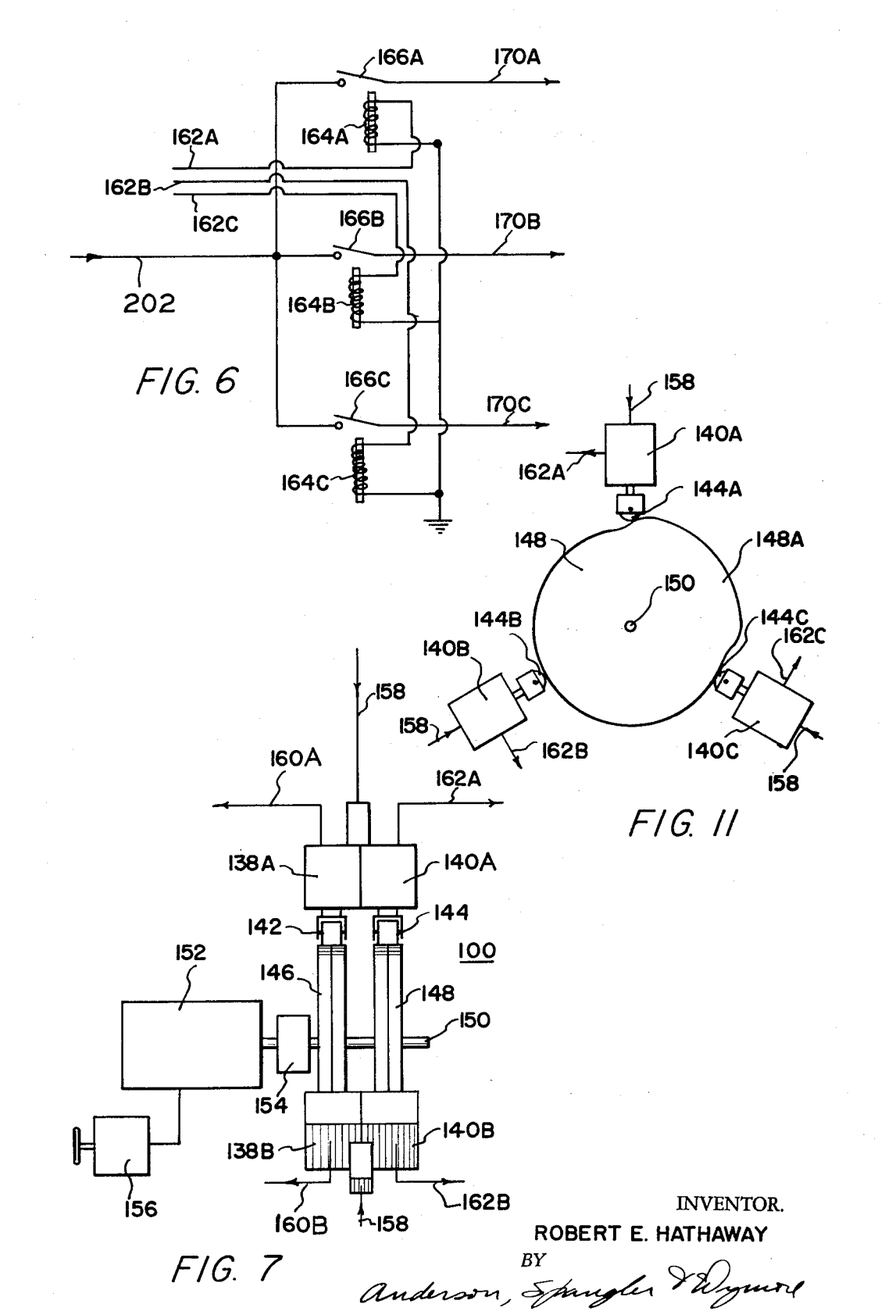
FIG. 6 is a circuit diagram of one form of an output switching arrangement suitable for use with the disclosed embodiments of the invention.
FIG. 7 is a representation schematically of a controller and synchronization unit suitable for controlling the sample handling mechanism of FIG. 4.
FIG. 11 is a side view of the controller and synchronization unit of FIG. 7.

The controller-synchronizer 100 provides the necessary signals to the programmer 112 of the sample handling and switching system 20 and the output switching system 92. Signals are developed thereby to control the duration of each sampling period and to synchronize the output signal from the electrical section 50 with the flowstream being delivered to the sensor unit. One embodiment of such a device is shown in FIG. 7 and FIG. 11 of the drawings, which shows cam actuated switches 138a, 138b and 138c and 140a, 140b, and 140c having actuators 142a, 142b, and 142c and 144a, 144b and 144c respectively, riding on a pair of adjustable cams 146 and 148 mounted on and driven by a shaft 150. Shaft 150 is connected to a variable speed motor 152 through a speed reducer 154. The speed of motor 152 may be controlled by a speed control 156 to control the sample switching rate. Multiple switches 138a, 138b and 138c may be placed around the cam in spaced relation with each switch providing a signal corresponding to a different position of the sample switching system as shown or a single switch can be used to advance the sampler one position with each actuation. Switch 138a may serve to complete a circuit from a power conductor 158 to the input conductor 160a of programmer 112 which causes the tank 102 to be lowered, rotated to the next station and lifted to connect the next sample to be tested into the sensor unit. At the same time an output from switch 140a is connected to input 162a of the output switching system shown in FIG. 6. On receipt of a signal by input 162a a relay 164a is actuated through a ground connection closing contacts 166a completing a circuit from the electrical section conductor 202 to output conductor 170a, effecting a connection from the electrical section 50 to recorder No. 1 and controller 94 to correlate the readout and recording of data therefrom with the measurements being made on flowstream No. 1. The length of the cam lobe 148a is adjusted in conjunction with the speed of motor 152 to provide the desired sample duration and the lobes 148a of cam 148 may be offset from those of cam 146 to delay switching of the output readout until the system has stabilized after a sample switch has been made. It will be appreciated by those skilled in the art that numerous other means may be used to synchronize the output of the electrical section with the position of the sample switching unit. For example, switches may be located so as to be actuated by a camming surface or protrusion on the rotating tank 102, thereby to connect the proper recorder to the electrical section or to send an identifying signal to the recorder to provide identification of the appropriate code mark on the chart of a single recorder for each position of the sample being analyzed.

Alternately, a single recorder could be used and the output switching device used in conjunction with a fixed potential and a divider circuit to selectively place marks on the recorder chart to identify the particular flowstream being monitored or any other means of indicating on a single recorder which flowstream is being monitored at any given time.

Figure 8:
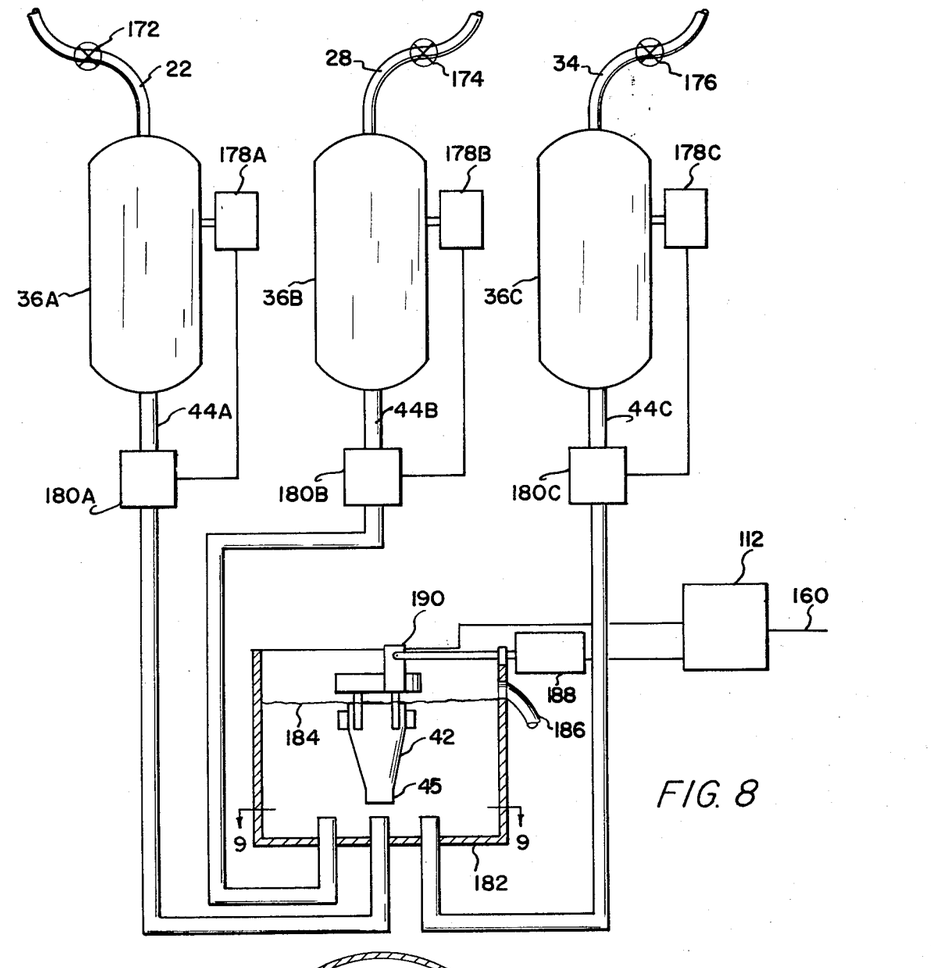
FIG. 8 shows another form of sampling and switching mechanism suitable for use with the embodiment of FIG. 2.
Figure 9:
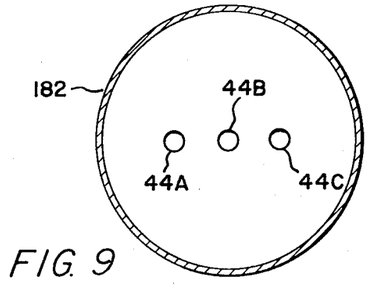
FIG. 9 is a view along line 9—9 of FIG. 8.

Another embodiment of the sample handling and switching system is set forth in FIG. 8 wherein the sample form each flowstream is treated in a separate air eliminator before being introduced into a common sensor unit. As shown in FIG. 2, again provision is made for the sampling of several flowstreams, three being shown by samplers 10, 12 and 14, which may again be a Model S2 Denver Automatic Sampler, or screened intake lines in agitated pumps in the flowstream. Flowstream No. 1 enters the No. 1 flowstream sampler 10 via inlet 16 and exits outlet 18. A sample is extracted therefrom and is passed to the corresponding air eliminator 36a via conduit 22. In like manner, flowstream No. 2 enters the No. 2 flowstream sampler 12 by means of inlet 24 and exits outlet 26. A sample is extracted therefrom and is passed to the corresponding air eliminator 36b via conduit 28. Also in like manner, flowstream No. 3 enters the No. 3 flowstream sampler 14 by means of inlet 30 and exits outlet 32. A sample is extracted therefrom and is passed to the corresponding air eliminator 36c via conduit 34. The inlet conduits 22, 28 and 34 to the air eliminators 36a, 36b and 36c are provided with valves 172, 174 and 176 respectively for control purposes in adjusting flow rates into the air eliminators 36a, 36b and 36c, FIG. 8.

Since the sensor chamber must be separate from the air eliminator to enable plumbing directly to the air eliminator discharge, the fluid operating level within the air eliminator which is regulated by the height of the sensor in the normal one sensor for one air eliminator case, is not self regulating. In order to maintain the proper liquid level, which is necessary for proper operation, a liquid level sensor 178a, 178b and 178c is provided on each air eliminator. A suitable liquid level sensor may be a bubble tube driving a model 43A proportional controller manufactured by the Foxboro Co. of Foxboro, Massachusetts. Also a flow control valve 180a, 180b, and 180c of the Clarkson type is provided in each outlet 44a, 44b and 44c of air eliminators 36a, 36b and 36c to regulate the discharge flow and thereby to hold the proper liquid level in each air eliminator. The outlet conduits 44a, 44b and 44c terminate within the tank 182 below the normal liquid level 184 and discharge thereinto continuously. Tank 182 is provided with an overflow 186, the position of which regulates the liquid level 184. The sensor section 42 is positioned within tank 182 below the normal liquid level and supported for longitudinal movement by a traversing mechanism 188 which moves the sensor section along a path aligned with the outlets 44a, 44b and 44c. A lifting and lowering mechanism 190 is provided for lifting and lowering the sensor section when the inlet 45 thereof is aligned with one of said outlets 44a, 44b or 44c. The traversing and lifting mechanisms 188 and 190 are under the command of programmer 112 which in turn is controlled by the controller-synchronizer 100 previously described.

The desired sample flow rate is set by adjusting the flow valves 172, 174 and 176. The level sensors 178a, 178b, and 178c open and close the automatic flow control valves 180a, 180b, and 180c as necessary to maintain a predetermined liquid level in the air eliminators. The de-aired samples are delivered to the bottom of tank 182 and the sensor section is moved over the outlet corresponding to the flowstream to be monitored as ordered by the controller-synchronizing unit 100 via programmer 112. The sample from a selected flowstream passes through the sensor section and the output from the electrical section 50 is directed via conductors 170a, 170b, and 170c to the proper recorder 94, 96 or 98 by the output switching system 92 under the control of the controller-synchronizing unit 100 via conductor 162. On command from the controller-synchronizing unit, the sensor section 42 is directed to be lifted by the lifting mechanism 190 and traversed by traversing mechanism 188 to a position directly above the end of another of the pipes 44a, 44b or 44c where the sensor section 42 is lowered into fluid tight connection therewith all under the direction of programmer 112 as commanded by controller-synchronizer 100 via conductor 160. The slurry level within the collecting tank 182 is kept sufficiently high so as to keep the sensors submerged while shifting from one sample stream to another. This prevents transients in the output signal which would result if the sensors were to be uncovered. The high level of slurry in tank 182 also prevents change in the slurry head presented to the sample lines as the sensor section is connected and disconnected thereto. This results in less surging and will assist in maintaining a constant level in, and flow through, the air eliminator.

Figure 2:
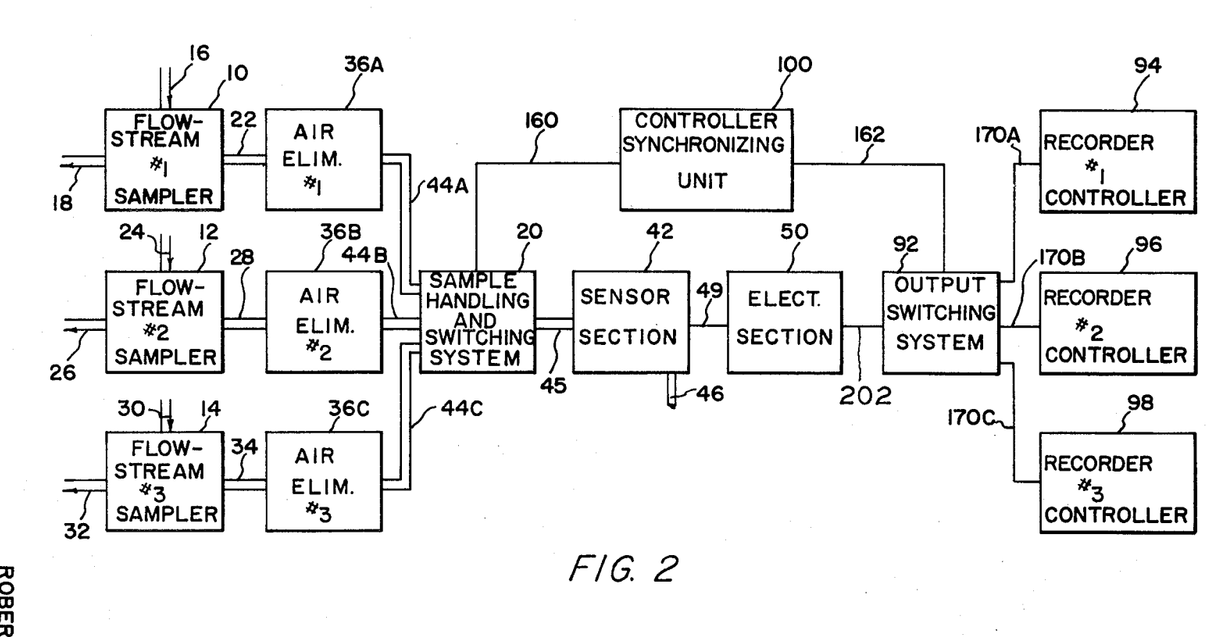
FIG. 2 is a schematic block diagram of another embodiment of the invention which uses an air eliminator for each flowstream sampled.

The de-aired sample switching system of FIG. 2 has the advantage over the air eliminator intake sample switching system of FIG. 1 in that no flowsteam monitoring time is lost while waiting for the new sample to purge the old one from the air eliminator.

Figure 3:
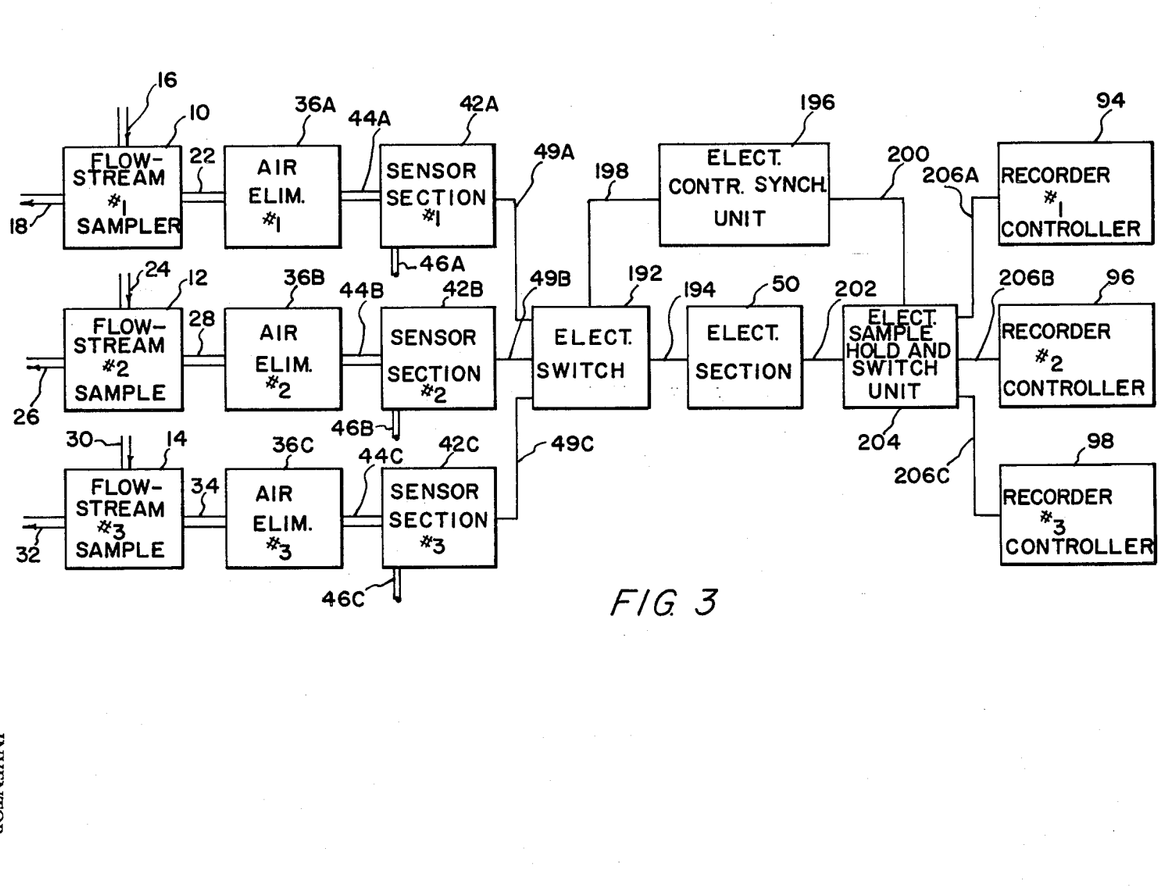
FIG. 3 is a schematic block diagram of still another embodiment of the invention which uses an air eliminator and a separate sensor section for each flowstream sampled.

Another embodiment of the sample handling and switching system according to this invention is set forth in FIG. 3 where the sample from each flowstream is de-aired by a separate air eliminator before being introduced into separate sensor sections. As shown in FIG. 3, again provision is made for the sampling of several flowstreams, three being shown, by samplers 10, 12, and 14 which may again be a Model S2 Denver Automatic Sampler or screened intake line placed in an agitated sump. Flowstream No. 1 enters the No. 1 flowstream sampler via inlet 16 and exits outlet 18. A sample is extracted therefrom and is passed to the corresponding air eliminator 36a via conduit 22. In like manner, flowstream No. 2 enters the No. 2 flowstream sampler 12 by means of inlet 24 and exits outlet 26. A sample is extracted therefrom and is passed to the corresponding air eliminator 36b via conduit 28. Also in like manner flowstream No. 3 enters the No. 3 flowstream sampler 14 by means of inlet 30 and exits outlet 32. A sample is extracted therefrom and is passed to the corresponding air eliminator 36c via conduit 34. The inlet conduits 22, 28 and 34 to the air eliminators 36a, 36b and 36c may be provided with valves therein for adjusting the flow rates into the air eliminators. The de-aired samples from air eliminators 36a, 36b and 36c are passed continuously to the respective sensor section 42a, 42b and 42c via conduits 44a, 44b and 44c. The samples exit the sensor sections via conduits 46a, 46b and 46c for discard.

An electrical output is generated by each sensor section 42a, 42b and 42c which outputs are fed to three inputs of electronic switch 192 via conductors 49a, 49b and 49c respectively. The electronic switch connects one of said three inputs to the output 194 thereof sequentially on receipt of a signal from the electronic controller-synchronizing unit 196 via conductor 198. The electronic switch 192 consists simply of state-of-the-art switching circuitry. In effect, a switching transistor or relay means is placed in series with each input fed by conductors 49a, 49b and 43c with the outputs connected in common with the input of the electrical section 50, FIG. 3, via conductor 194. Each switching transistor or relay means then responds to sequential signals from the electronic controller-synchronization unit 196 at any rate as determined by the sync unit which may be adjusted from zero to several times per second. The electronic controller-synchronization unit 196 in its simplest form is an electronic clock and pulse generator. The circuitry is entirely conventional and well within the art. The clock frequency and pulse duration are adjustable to enable control of the rate and duration of the signals generated to control the electronic switch 192 and the other on conductor 200 to synchronize the switching of the output signals from the electrical section 50 with the switching of the signals from the sensor sections. The output from the electrical section 50 is fed via conductor 202 to the electronic sample, hold and switching unit 204. This unit consists of switching transistors or relay means very similar to those in the electronic switch 192 except that D.C. signals are being switched rather than the high frequency bursts switched by the electronic switch 192. In addition to the switch, sample and hold circuitry is included to hold the recorder at the last value until it is fed a signal again. The sample and hold circuit may consist of a simple integrator using a capacitor to store the signal between samplings. With the use of three separate recorders, as shown, the switching rate can be made sufficiently high that each recorder will indicate as if it were monitoring full time. When sensor 42a is sampled by connecting the input signal on conductor 49a to the output of electronic switch 192, an output signal from the electrical section 50 is fed via conductor 206a to recorder 94 corresponding to flowstream No. 1 under the control of the electronic controller synchronization unit 196. In like manner, when sensor 42b is sampled, the output is fed to recorder 96 corresponding to flowstream No. 2 and when sensor 42c is sampled, the output is fed to recorder 98 corresponding to flowstream No. 3.

What is claimed is:

1. Apparatus for automatically analyzing and controlling the mean particle size and percent solids content of a plurality of slurry flowstreams comprising:
   sampling means adapted for removing a sample from each flowstream;
   an automatic analyzer including a sensor section and an electrical section capable of generating an electrical signal which is a function of the mean particle size and the percent solids in a slurry;
   means including conduit means connecting the sampling means to the sensor section for delivery of a selected sample thereto to be analyzed;
   air eliminator means for removing entrained gases from a sample stream prior to analysis located in said conduit means intermediate the sampling means and the sensor section;
   recorder-controller means adapted for recording the signals associated with one or more flowstream samples and/or for controlling variables associated with one or more corresponding flowstreams;
   circuit means including switching means for selectively transmitting the electrical signal generated by the analysis of a sample from a selected flowstream to a recorder-controller device associated with that flowstream; and,
   synchronizing means for synchronizing the analysis of a sample from the selected flowstream with the transmittal to and identification of the generated electrical signal therefrom to the recorder-controller associated with that flowstream.

2. The apparatus of claim 1 wherein a single recorder-controller is associated with a plurality of flowstreams and is provided with means responsive to selected transmitted signals from said switching means of the circuit means to identify the transmitted and recorded signals with the corresponding flowstream being analyzed.

3. The apparatus of claim 1 wherein there are provided a plurality of recorder-controller devices with at least one recorder-controller device being associated with each flowstream.

4. The apparatus of claim 1 including a sensor section corresponding to each flowstream sampled, each sensor having an output, and electrical switch means adapted to connect the output of each sensor section to the electrical section when the circuit switching means connects the output of the electrical section to the recorder-controller corresponding to the selected flowstream at the direction of the synchronizing means.

5. The apparatus according to claim 1 including sample switching and handling means positioned in the conduit means between the sampling means and the sensor section adapted to transfer a sample from a selected flowstream into the sensor section when the circuit switching means connects the output of the electrical section to the recorder-controller corresponding to the selected flowstream at the direction of the synchronizing means.

6. The apparatus according to claim 4 wherein there is provided a sampling means for each flowstream sampled connected to deliver a sample to a corresponding sensor section.

7. The apparatus of claim 5 wherein the air eliminator means is located in said conduit intermediate the sample handling and switching means and the sensor section.

8. The apparatus of claim 5 wherein an air eliminator means is located in the conduit between each sampling means and the sample handling and switching means.

9. The apparatus of claim 5 wherein the sample switching and handling means comprises a slurry receiving chamber adapted to receive and receiving samples of slurry from said sampling means via inlet conduits having ends terminating below the normal liquid level in said chamber, means establishing a normal liquid level in said chamber, an outlet conduit having its inlet end positioned beneath the normal liquid level of said chamber and movable conduit connecting means adapted to connect a selected inlet conduit end with the inlet of said outlet conduit on command of the synchronizing means to transfer a sample from a selected flowstream via said selected inlet conduit, said movable conduit connecting means and said outlet means to said sensor section.

10. The apparatus of claim 5 wherein the sample switching and handling means comprises a slurry receiving chamber adapted to receive and receiving samples of slurry from said sampling means via inlet conduits having ends terminating below the normal liquid level in said chamber, means establishing a normal liquid level in said chamber, a sensing chamber having an inlet and being movably mounted within said chamber to be located beneath the normal liquid level thereof, means operatively connected to said movably mounted sensing chamber and adapted to move the inlet thereof into registry with a selected one of said inlet conduits on command of the synchronizing means to transfer a sample from a selected flowstream to said sensing chamber.

11. A method for automatically analyzing and controlling the mean particle size and percent solids content of a plurality of slurry flowstreams comprising the steps of:
removing a sample from each of the flowstreams;
substantially eliminating any entrained gases from each sample;
presenting each of the samples in sequence to an automatic analyzer capable of generating an electrical signal which is a function of the mean particle size and the percent solids in the slurry; and
transmitting the generated electrical signal in sequence to each of a plurality of recorder-controller devices, each device being associated with one of the flowstreams in synchronism with the presentation of a sample from a respective flowstream to the analyzer.

12. A method for automatically analyzing and controlling the mean particle size and percent solids content of a plurality of flowstreams of slurry comprising the steps of:
removing a sample from each of the flowstreams;
substantially eliminating any entrained gases from each sample;
simultaneously directing each of the samples to a sample handling means;
presenting each of the samples from the sample handling means in sequence to an automatic analyzer capable of generating an electrical signal which is a function of the mean particle size and the percent solids in the slurry; and
transmitting the generated electrical signal in sequence to each of a plurality of recorder-controller devices, each device being associated with one of the flowstreams in synchronism with the presentation of a sample from a respective flowstream to the analyzer.

13. A method for automatically analyzing and controlling the mean particle size and percent solids content of a plurality of flowstreams of slurry comprising the steps of:
removing a sample from each of the flowstreams;
substantially eliminating any entrained gases from each sample;
simultaneously directing each of the samples to a sample handling means;
presenting each of the samples from the sample handling means in sequence to an automatic analyzer capable of generating an electrical signal which is a function of the mean particle size and the percent solids in the slurry;
transmitting the generated signal in sequence to a recorder-controller device in synchronism with the presentation of a sample from a respective flowstream to the analyzer; and
coding said recorded signal in said recorder-controller to correspond with the respective flowstream analyzed.

* * * * *